Jan. 12, 1965  A. J. URBATS  3,164,974
UNIVERSAL WEDGE-TYPE COUPLING
Filed Sept. 10, 1963  2 Sheets-Sheet 1
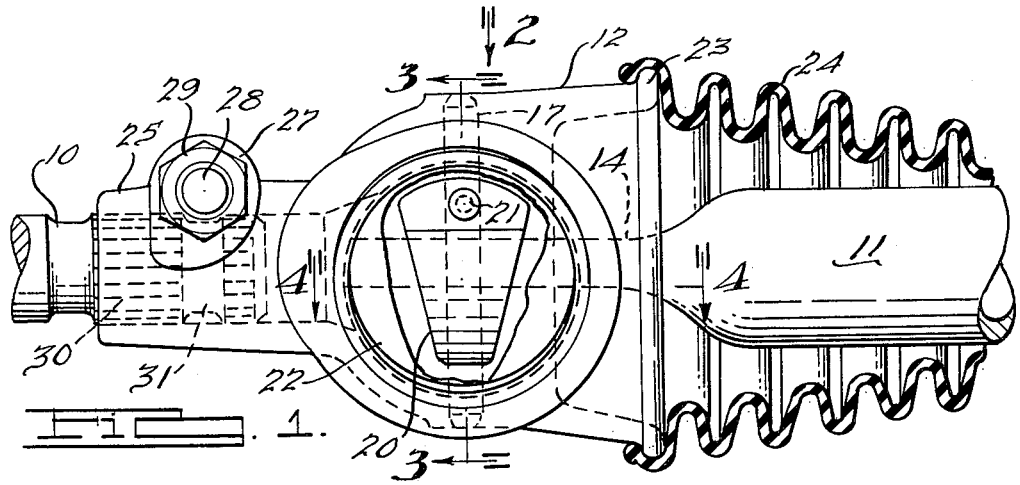
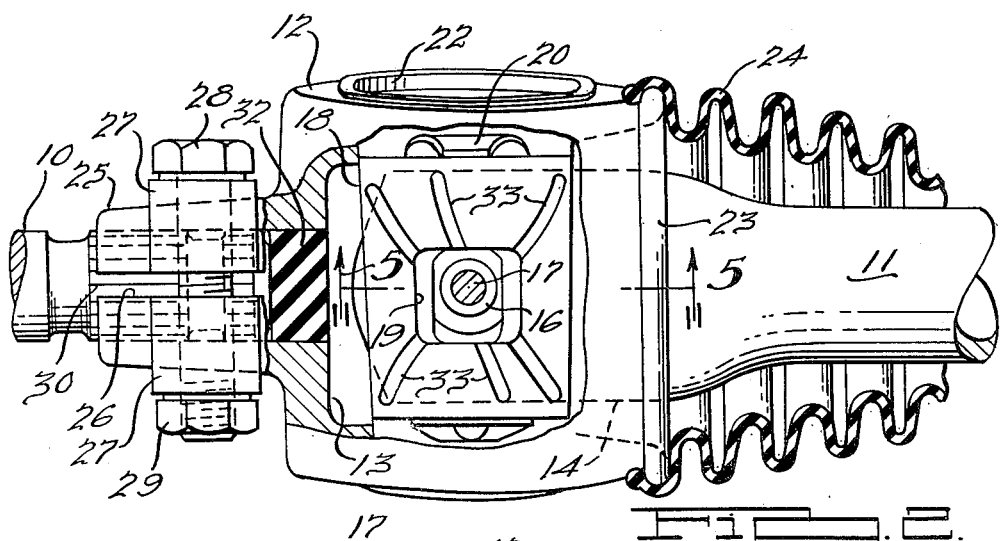
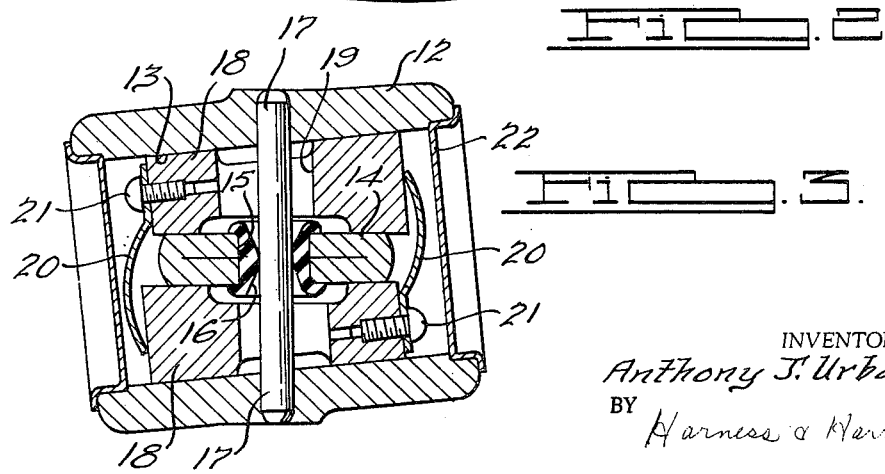
INVENTOR.
Anthony J. Urbats.
BY Harness & Harris
ATTORNEYS.

United States Patent Office 3,164,974
Patented Jan. 12, 1965

3,164,974
UNIVERSAL WEDGE-TYPE COUPLING
Anthony J. Urbats, Livonia, Mich., assignor to Chrysler Corporation, Highland Park, Mich., a corporation of Delaware
Filed Sept. 10, 1963, Ser. No. 307,865
5 Claims. (Cl. 64—7)

This invention relates to steering gears for automotive vehicles and in particular to an improved economical coupling between a manually operated driving shaft and a driven shaft of a vehicle steering gear.

It is customary to provide a universal coupling between the manually operated steering shaft and the shaft of the steering gear in order to facilitate assembly of these shafts and the gear in the vehicle body by compensating for unavoidable misalignment. It is important to avoid play or lost motion in such a coupling in order to achieve efficient steering control. It is also important to provide resiliency in the coupling in order to minimize feed back of road forces or vibrations to the manual steering wheel.

Heretofore in order to avoid play or lost motion in such couplings without resorting to the manufacture of costly precision parts, it has been customary to pack the coupling with heavy grease. Such a procedure involves troublesome maintenance because the grease eventually works out from between the working parts. The resulting lost motion therebetween becomes objectionable.

An important object of the present invention is to provide a universal coupling between the steering gear and manually actuated steering shaft which satisfies the foregoing requirements, yet which avoids the necessity of maintaining close production tolerances and thereby achieves economies and simplicities in production and assembly not possible heretofore.

Another and more specific object is to provide an economical trouble free universal coupling characterized by its freedom from play or lost motion between its working parts.

Other objects of this invention will appear in the following description and appended claims, reference being had to the accompanying drawings forming a part of this specification wherein like reference characters designate corresponding parts in the several views.

FIGURE 1 is an elevational view of a coupling for a vehicle steering shaft embodying the present invention.

FIGURE 2 is a plan view, partly in section, taken in the direction of the arrow 2 of FIGURE 1.

FIGURE 3 is a sectional view taken in the direction of the arrows substantially along the line 3—3 of FIGURE 1.

Figure 4:
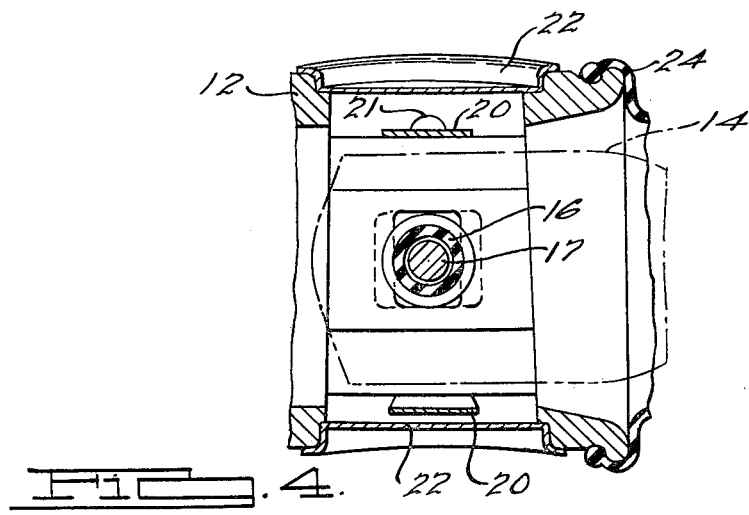
FIGURE 4 is a sectional view taken in the direction of the arrows substantially along the line 4—4 of FIGURE 1.
Figure 5:
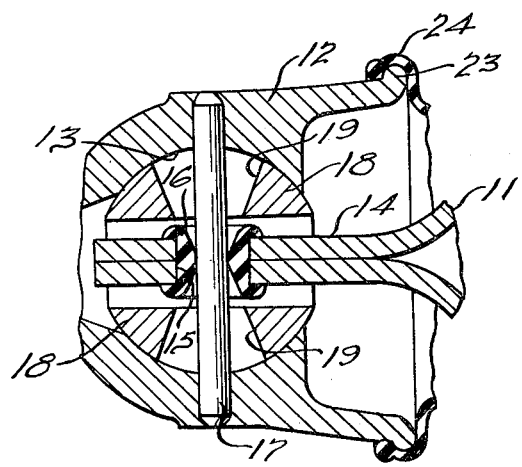
FIGURE 5 is a sectional view taken in the direction of the arrows substantially along line 5—5 of FIGURE 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in a universal coupling between the rotatable shaft 10 of a vehicle steering gear and the manually rotatable steering shaft 11. Shaft 10 is connected by means of a steering gear, which may be conventional, to the dirigible wheels of a vehicle to steer the same. In consequence of the stack-up of tolerances in the steering gear, a limited amount of axial and angular adjustment is required of one or both of the shafts 10 and 11.

In order to accommodate the need for such adjustment, a universal coupling between shafts 10 and 11 is provided comprising an outer cast housing or casing 12 formed with a cylindrical bore 13 having its axis transverse or perpendicular to the axis of shaft 11. A splayed or flattened end 14 of the latter shaft extends through a lateral opening in the housing 12 with the plane of the splayed end 14 oblique to the axis of cylindrical chamber 13.

As illustrated in FIGURE 3, the flattened end 14 is provided with a centrally located circular hole 15 which contains an annular grommet 16 of resilient rubber-like material. The central portion of the annular grommet 16 is thickened to extend radially inward and engage the circumference of a retaining pin 17 which normally extends coaxially through the grommet 16 perpendicularly to the surface of the splayed end 14. From the central thickened portion of the grommet 16, the latter's inner opening enlarges conically in opposite directions axially of the pin 17 to enable limited angular adjustment of the plane of the end 14 with respect to the axis of pin 17 as explained below.

Above and below the splayed end 14 are a pair of oppositely directed cooperating wedge elements 18, each having an inner plane surface in sliding contact with one of each of the opposite plane surfaces of the splayed end 14 and also having an outer cylindrical surface coaxial with the cylindrical surface of the chamber 13 and engaging the latter for rotation coaxially therein as well as for axial sliding movement.

Each of the wedge elements 18 is provided with a centrally located and outwardly enlarging hole 19 through which the pins 17 extends, the opposite outer ends of the latter being pressed snugly into bores in the housing 12 at diametrically opposite sides of the chamber 13. The outer portions of the bores in housing 12 for the ends of pin 17 are staked inwardly to prevent accidental displacement of the pin 17.

In order to effect a wedge action for the elements 18, a leaf-type spring 20 is suitably secured to one end of each element 18 by a screw 21 at the edge of the splayed end 14 adjacent one axial end of the cylinder 13. Each spring 20 extends from its screw 21 to the other element 18 at the same axial end of the chamber 13 and resiliently engages the other element 18 to pull on one element and push on the other in a wedge action causing the elements 18 to grip the splayed end 14 therebetween.

Opposite ends of the chamber 13 are closed by end closure caps 22. Extending coaxially around the shaft 11 and defining the opening in housing 12 through which the latter shaft extends is an annular bead 23 integral with the housing 12 and providing a leak-proof attachment with one end of a flexible accordion-type grease and dirt shield 24. The other end of the shield suitably grips the shaft 11 in sealing contact.

Projecting from housing 12 coaxially with bead 23 and diametrically opposite the latter is an integral internally splined tubular extension 25. The latter is provided with a longitudinal slot 26 and a pair of integral bolt retaining lugs 27 at opposite sides of the slot 26. A bolt 28 extends through the lugs 27 perpendicularly to the axis of shaft 10 and is secured by a nut 29, whereby the opposite sides of slot 26 are drawn toward each other in a clamping action around the externally splined end 30 of shaft 10. The splined end 30 is provided with an annular groove 31 which accommodates the shank of bolt 28 and positively interlocks the shaft 10 with extension 25 of casing 12. The opening of the tubular extension 25 into cylindrical chamber 13 is suitably plugged by a rubber-like closure 32.

In accordance with the structure described, rotation of shaft 11 is transmitted through splayed end 14 to the wedge elements 18 and thence to housing 12 to rotate the latter and extension 25 and shaft 10 secured thereto. Limited adjustment of the axis of shaft 11 with respect to the axis of shaft 10 is permitted by pivoting of the splayed end 14 about the axis of pin 17, or by rotation of the splayed end 14 as a unit with the wedge elements 18 coaxially within cylindrical chamber 13. In the above regard, the outer cylindrical surfaces of the wedge elements 18 engage the cylindrical surface of chamber 13 in bearing contact and are rotatable coaxially therein. Lubrication of the latter surface is facilitated by lubrication grooves 33 in the outer cylindrical surfaces of the wedge elements 18.

The opening defined by bead 23 is sufficiently oversize with respect to the splayed end 14 to enable the desired angular adjustment of the latter with respect to the axes of both pin 17 and chamber 13. Also the openings 19 and the conically enlarged central hole of grommet 16 are dimensioned to enable the aforesaid angular adjustment of the splayed end 14. The central enlarged annular portion of grommet 16 frictionally engages the pin 17 to enable rotation of the splayed end 14 around the axis of the pin 17, but otherwise snugly engages the pin 17 to eliminate play or lost motion between the parts. By reason of the resiliency of the grommet 16, road shock and vibration is damped in its transmission to shaft 11 and limited axial adjustment of splayed end 14 is enabled. Also by reason of the spring 20 urging the wedge elements 18 in axially opposite directions within chamber 13, all play or lost motion between the splayed end 14 and casing 12 is avoided. In consequence, an economical coupling is provided which eliminates all lost motion between the parts, yet which can be manufactured with comparatively large tolerances that can be readily maintained in mass production.

I claim:

1. In a steering gear, a housing having a cylindrical chamber, a manually rotatable shaft extending transversely to the axis of said cylindrical chamber and having a splayed end projecting obliquely to said axis into said chamber through an opening in said housing, a pair of wedge elements, each wedge element having a plane inner surface engaging one of each of the opposite surfaces of said splayed end and having a cylindrical outer surface coaxial with said cylindrical chamber and slidably engaging the cylindrical wall thereof, a pin secured within said housing and extending through aligned openings in said wedge elements and splayed end transversely to the plane thereof, resilient means urging said wedge elements axially of said cylindrical housing in opposite directions respectively to grip said splayed end therebetween, the aligned openings in said elements and splayed end being oversize with respect to the diameter of said pin, also said opening in said housing being oversize with respect to said shaft and splayed end to enable limited pivotal movement of said splayed end about the axis of said pin, and also to enable limited rotation of said wedge elements and splayed end as a unit within said cylindrical housing about the axis thereof.

2. In a coupling, a housing having a cylindrical chamber, a manually rotatable shaft extending transversely to the axis of said cylindrical chamber and having a splayed end projecting obliquely to said axis into said chamber through an opening in said housing a pair of wedge elements, each wedge element having a plane inner surface engaging one of each of the opposite surfaces of said splayed end and having a cylindrical outer surface coaxial with said cylindrical chamber and slidably engaging the cylindrical wall thereof, a pin secured within said housing and extending through aligned openings in said wedge elements and splayed end transversely to the plane thereof, resilient means urging said wedge elements axially of said cylindrical housing in opposite directions respectively to grip said splayed end therebetween, an annular grommet of resilient rubber-like material confined within the opening in said splayed end, said grommet having a central annular region frictionally gripping said pin and enabling pivoting of said grommet and splayed end about the axis of said pin, the opening in said annular grommet enlarging axially of said pin in opposite directions from said central annular region to enable angular adjustment of the plane of said splayed end with respect to the axis of said pin upon rotation of said wedge elements and splayed end as a unit axially within said housing, said aligned openings in said wedge elements being also oversize with respect to said pin to enable said angular adjustment, and said opening in said housing being oversize with respect to said shaft and splayed end to enable said pivoting of said splayed end and grommet about the axis of said pin and said rotation of said splayed end and wedge elements as a unit coaxially within said cylindrical chamber.

3. In a steering gear a housing having a cylindrical chamber, a manually rotatable shaft extending transversely to the axis of said cylindrical chamber and having a splayed end projecting into said chamber obliquely to said axis through an opening in said housing, a pair of wedge elements, each wedge element having a plane inner surface engaging one of each of the opposite surfaces of said splayed end and having a cylindrical outer surface coaxial with said cylindrical chamber and engaging the cylindrical wall thereof for sliding axially thereof and for rotating coaxially therein as a unit with said splayed end, a pin secured within said housing and extending through aligned openings in said wedge elements and splayed end transversely to the plane thereof, resilient means urging said wedge elements in opposite directions respectively along said axis to grip said splayed end therebetween, the aligned openings in said elements and splayed end being oversize with respect to the diameter of said pin, also said opening in said housing being oversize with respect to said shaft and splayed end to enable limited pivotal movement of said splayed end about the axis of said pin, and also to enable limited rotation of said wedge elements and splayed end as a unit within said cylindrical housing about the axis thereof.

4. In a steering gear, a housing having a cylindrical chamber, a manually rotatable shaft extending transversely to the axis of said cylindrical chamber and having a splayed end projecting into said chamber obliquely to said axis through an opening in said housing, a pair of wedge elements, each wedge element having a plane inner surface engaging one of each of the opposite surfaces of said splayed end and having a cylindrical outer surface coaxial with said cylindrical chamber and engaging the cylindrical wall thereof for sliding axially thereof and for rotating coaxially therein as a unit with said splayed end, a pin secured within said housing and extending through aligned openings in said wedge elements and splayed end transversely to the plane thereof, resilient means urging said wedge elements in opposite directions respectively along said axis to grip said splayed end therebetween, an annular grommet of resilient rubber-like material confined within the opening in said splayed end, said grommet having a central annular region frictionally gripping said pin and enabling pivoting of said grommet and splayed end about the axis of said pin, the opening in said annular grommet enlarging axially of said pin in opposite directions from said central annular region to enable angular adjustment of the plane of said splayed end with respect to the axis of said pin upon rotation of said wedge elements and splayed end as a unit axially within said housing, said aligned openings in said wedge elements being also oversize with respect to said pin to enable said angular adjustment, and said opening in said housing being oversize with respect to said shaft and splayed end to enable said pivoting of said splayed end and grommet about the axis of said pin and said rotation of said splayed end and wedge elements as a unit coaxially within said cylindrical chamber.

5. In a coupling, a housing having a cylindrical chamber, a manually rotatable shaft extending transversely to the axis of said cylindrical chamber and having a splayed end projecting into said chamber obliquely to said axis through an opening in said housing, a pair of wedge elements, each wedge element having a plane inner surface engaging one of each of the opposite surfaces of said splayed end and having a cylindrical outer surface coaxial with said cylindrical chamber and engaging the cylindrical wall thereof for sliding axially thereof and for rotating coaxially therein as a unit with said splayed end, a pin secured within said housing and extending through aligned openings in said wedge elements and splayed end transversely to the plane thereof, resilient means urging said wedge elements in opposite directions respectively along said axis to grip said splayed end therebetween, an annular grommet of resilient rubber-like material confined within the opening in said splayed end, said grommet having a central annular region frictionally gripping said pin and enabling pivoting of said grommet and splayed end about the axis of said pin, the opening in said annular grommet enlarging axially of said pin in opposite directions from said central annular region to enable angular adjustment of the plane of said splayed end with respect to the axis of said pin upon rotation of said wedge elements and splayed end as a unit axially within said housing, said aligned openings in said wedge elements being also oversize with respect to said pin to enable said angular adjustment, and said opening in said housing being oversize with respect to said shaft and splayed end to enable said pivoting of said splayed end and grommet about the axis of said pin and said rotation of said splayed end and wedge elements as a unit coaxially within said cylindrical chamber.

References Cited in the file of this patent

UNITED STATES PATENTS

| | | |
|---|---|---|
| 2,111,693 | Schnuck | Mar. 22, 1938 |
| 2,792,693 | Norlindh | May 21, 1957 |

FOREIGN PATENTS

| | | |
|---|---|---|
| 262,144 | Great Britain | Mar. 31, 1927 |